(12) United States Patent
Hutchinson et al.

(10) Patent No.: US 12,541,364 B2
(45) Date of Patent: Feb. 3, 2026

(54) OPTIMIZING SOFTWARE DEVELOPMENT GLOBALIZATION

(71) Applicant: Dell Products L.P., Round Rock, TX (US)

(72) Inventors: Kirk Alan Hutchinson, Londonderry, NH (US); Eliyahu Rosenes, Shemesh (IL); Roman Bober, Asdod (IL); Yonit Lopatinski, Shomriya (IL); Lior Gdaliahu, Modiin (IL)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 18/352,342

(22) Filed: Jul. 14, 2023

(65) Prior Publication Data

US 2025/0021331 A1 Jan. 16, 2025

(51) Int. Cl.
*G06F 8/76* (2018.01)
*G06F 8/41* (2018.01)
*G06F 9/451* (2018.01)

(52) U.S. Cl.
CPC ............... *G06F 8/76* (2013.01); *G06F 8/41* (2013.01); *G06F 9/454* (2018.02)

(58) Field of Classification Search
None
See application file for complete search history.

(56) References Cited

U.S. PATENT DOCUMENTS

| | | | |
|---|---|---|---|
| 2009/0031170 A1* | 1/2009 | Tsurumi | G06F 11/3696 714/38.14 |
| 2017/0371631 A1* | 12/2017 | Haiderzaidi | G06F 9/454 |
| 2017/0371762 A1* | 12/2017 | Haiderzaidi | G06F 11/3612 |
| 2017/0371763 A1* | 12/2017 | Haiderzaidi | G06F 9/454 |
| 2017/0371764 A1* | 12/2017 | Haiderzaidi | G06F 11/3612 |

* cited by examiner

*Primary Examiner* — Ryan D. Coyer
(74) *Attorney, Agent, or Firm* — Chamberlain, Hrdlicka, White, Williams & Aughtry; Aly Z. Dossa (57) ABSTRACT

A method for optimizing software development globalization. The method includes: identifying a globalization element and at least one globalization element data field associated therewith; and configuring, into a source-code and for the globalization element, a globalization element code structure including at least one member key, respectively and at least in part, defining the at least one globalization element data field.

20 Claims, 9 Drawing Sheets

OPTIMIZING SOFTWARE DEVELOPMENT GLOBALIZATION

BACKGROUND

Globalization, in the software development context, refers to the process of adapting software products (e.g., software applications) for international audiences or users. The practice of globalization today commonly involves several manual steps that tend to be time-consuming and error-prone, thereby leading to longer development times and issues with final software products.

SUMMARY

In general, in one aspect, embodiments described herein relate to a method for optimizing software development globalization. The method includes: identifying a globalization element and at least one globalization element data field associated therewith; and configuring, into a source-code and for the globalization element, a globalization element code structure including at least one member key, respectively and at least in part, defining the at least one globalization element data field.

In general, in one aspect, embodiments described herein relate to a non-transitory computer readable medium. The non-transitory computer readable medium includes computer readable program code, which when executed by a computer processor, enables the computer processor to perform a method for optimizing software development globalization. The method includes: configuring, for a globalization element, a globalization element code structure, the configuring including: identifying the globalization element and at least one globalization element data field associated therewith; for each globalization element data field of the at least one globalization element data field: creating, for the globalization element data field, a code structure member including a member key and a member type; and populating the globalization element code structure using the code structure member.

In general, in one aspect, embodiments described herein relate to a computing device. The computing device includes: memory; a computer processor operatively connected to the memory; and a code editor and a code compiler both executing on the computer processor and configured, when interacted with, to perform a method for optimizing software development globalization. The method includes: configuring, for a globalization element, a globalization element code structure, the configuring including: identifying the globalization element and at least one globalization element data field associated therewith; for each globalization element data field of the at least one globalization element data field: creating, for the globalization element data field, a code structure member including a member key and a member type; and populating the globalization element code structure using the code structure member.

Other aspects of the invention will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to optimizing software development globalization. Globalization, in the software development context, refers to the process of adapting software products (e.g., software applications) for international audiences or users. The practice of globalization today commonly involves several manual steps that tend to be time-consuming and error-prone, thereby leading to longer development times and issues with final software products. More specifically, said practice-followed by many development teams     includes creating a text-based properties file format to define source language property key-value pairs for all globalization elements of a same type. For example, the properties file format may be populated with the following information:

InstanceId_1.Field_1=Value_1
    InstanceId_1.Field_2=Value_2
    InstanceId_1.Field_3=Value_3
    InstanceId_2.Field_1=Value_4
    InstanceId_2.Field_2=Value_5
    InstanceId_2.Field_3=Value_6

That is, software developers today require defining their source language content in a text file, which fails to provide validation on unique instance identifiers (IDs), any data field types (i.e., property key types), and any data field quantities (i.e., property values). While some automated test validation transpires, full validation of the entirety of the property key-value pairs often takes place at runtime through manual, visual inspection by testing teams following the commitment, building, and deployment of all related source-code. Furthermore, because said information, pertinent to software development globalization, is placed in a text file outside the source-code, there is no way for any of the source-code to directly reference any of the property key-value pairs stored in said text file.

Embodiments described herein, accordingly, implement a solution addressing the above-mentioned issue(s), and thus is directed to optimizing software development globalization by leveraging source-code editor and/or compiler capabilities. Particularly, the solution proposes configuring a single code structure to define any desired globalization data fields for each globalization element (e.g., a software application aspect sought to be adapted for international users). Said code structure may subsequently promote globalization-pertinent data being created by software developers in their desired code language to support compile time validation of globalization-pertinent data formatting, thereby minimizing manual efforts and the risk of errors (leading the improved accuracy of final software products). Other benefits of the solution include: improved development efficiency compelled by source-code editor and/or compiler capabilities to facilitate the identification and correction of any format-driven warnings and/or errors at development time; and direct referencing to globalization-pertinent data by any other relevant source-code (e.g., business logic code), thereby reducing code complexity and improving code maintainability. Overall, embodiments described herein propose significantly improving the software development globalization process, and thus providing software developers with a reliable and efficient solution for seamless global deployment.

Figure 1:
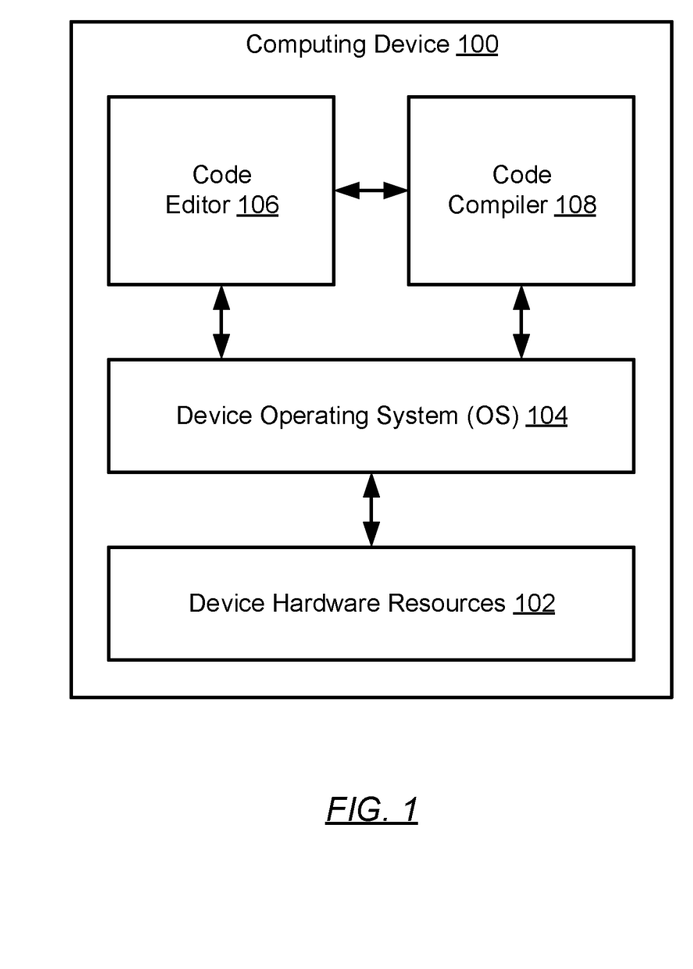
FIG. 1 shows a computing device in accordance with one or more embodiments described herein.

FIG. 1 shows a computing device in accordance with one or more embodiments described herein. The computing device (100) may be operated by a software developer, or an individual whom develops (e.g., designs, programs, builds, deploys, and maintains) software. The computing device (100), accordingly, may include device hardware resources (102), a device operating system (OS) (104), a code editor (106), and a code compiler (108). Each of these computing device (100) components is described below.

In one or many embodiment(s) described herein, the device hardware resources (102) may represent a collection of physical resources natively available to, or physically installed on, the computing device (100). Said collection of physical resources may include, but are not limited to, compute resources (not shown), memory resources (not shown), storage resources (not shown), networking resources (not shown), and accelerated compute resources (not shown). Each of these physical resources is described below.

In one or many embodiment(s) described herein, compute resources may encompass any number of integrated circuits for processing computer readable instructions (e.g., central processing unit(s) (CPU), also referred to herein as computer processors).

In one or many embodiment(s) described herein, memory resources may encompass any number of non-transitory computer readable memory media configured to store various forms of data in whole or in part, and temporarily or permanently. Examples of said non-transitory computer readable memory media may include, but are not limited to, volatile memory (e.g., static random access memory (SRAM), dynamic random access memory (DRAM), and synchronous dynamic random access memory (SDRAM)) and non-volatile memory (e.g., read-only memory (ROM) and flash memory).

In one or many embodiment(s) described herein, storage resources may encompass any number of non-transitory computer readable storage media configured to store various forms of data in whole or in part, and temporarily or permanently. Examples of said non-transitory computer readable storage media may include, but are not limited to, optical storage (e.g., compact discs (CDs) and digital versatile discs (DVDs)), magnetic storage (e.g., magnetic tapes, floppy disks, and hard disk drives (HDDs)), and solid state storage (e.g., solid state drives (SSDs), thumb drives, and secure digital (SD) cards).

In one or many embodiment(s) described herein, networking resources may encompass any number of integrated circuits for receiving and transmitting data over any number of networks and using any number of communication protocols. Examples of said integrated circuits may include, but are not limited to, network adapters and network interfaces.

In one or many embodiment(s) described herein, accelerated compute resources may encompass specialized hardware configured to speed up demanding workloads through the use of parallel processing. Examples of said specialized hardware may include, but are not limited to, graphics processing units (GPU), data processing units (DPU), tensor processing units (TPU), and vision processing units (VPU).

In one or many embodiment(s) described herein, the device OS (104) may represent a computer program (e.g., software) that may execute on the underlying hardware (e.g., device hardware resources (102)) of the computing device (100), where said computer program may be responsible for overseeing computing device (100) operations. To that extent, and at least in part, the device OS (104) may include functionality to: support fundamental computing device (100) functions; schedule tasks; mediate interactivity between logical (e.g., software) and physical (e.g., hardware) computing device (100) components; allocate the device hardware resources (102), as needed, to support installed software operability; and execute or invoke other computer programs (e.g., code editor (106), code compiler (108), etc.) executing on the computing device (100). One of ordinary skill, however, will appreciate that the device OS (104) may perform other functionalities without departing from the scope of the embodiments described herein.

In one or many embodiment(s) described herein, the code editor (106) may represent a computer program (e.g., software) that may execute on the underlying hardware (e.g., device hardware resources (102)) of the computing device (100), where said computer program may facilitate software source-code writing and/or editing. To that extent, and at least in part, the code editor (106) may include functionality to provide any number of capabilities and features found across any number of existing (source)-code editors. One of ordinary skill, however, will appreciate that the code editor (106) may perform other functionalities without departing from the scope of the embodiments described herein.

In one or many embodiment(s) described herein, the code compiler (108) may represent a computer program (e.g., software) that may execute on the underlying hardware (e.g., device hardware resources (102)) of the computing device (100), where said computer program may facilitate translation of software source-code to computer readable program code (e.g., machine code). To that extent, and at least in part, the code compiler (108) may include functionality to provide any number of capabilities and features found across any number of existing (source)-code compilers. One of ordinary skill, however, will appreciate that the code compiler (108) may perform other functionalities without departing from the scope of the embodiments described herein.

Examples of the computing device (100) may include, but are not limited to, a desktop computer, a laptop computer, a tablet computer, a smartphone, a network server, and any computing system similar to the exemplary computing system illustrated and described with respect to FIG. 5, below.

While FIG. 1 shows a configuration of components and/or subcomponents, other computing device (100) configurations may be used without departing from the scope of the embodiments described herein.

For example, in one or many other embodiment(s) described herein, the code editor (206) and the code compiler (208)—each depicted in FIG. 1 as a standalone computer program—may instead be combined to form an integrated development environment (IDE) (not shown). An IDE may represent a comprehensive computer program (e.g., software) that provides software developers a variety of tools and features directed, at least in part, to writing/editing, compiling, debugging, and testing software source-code.

Figure 2A:
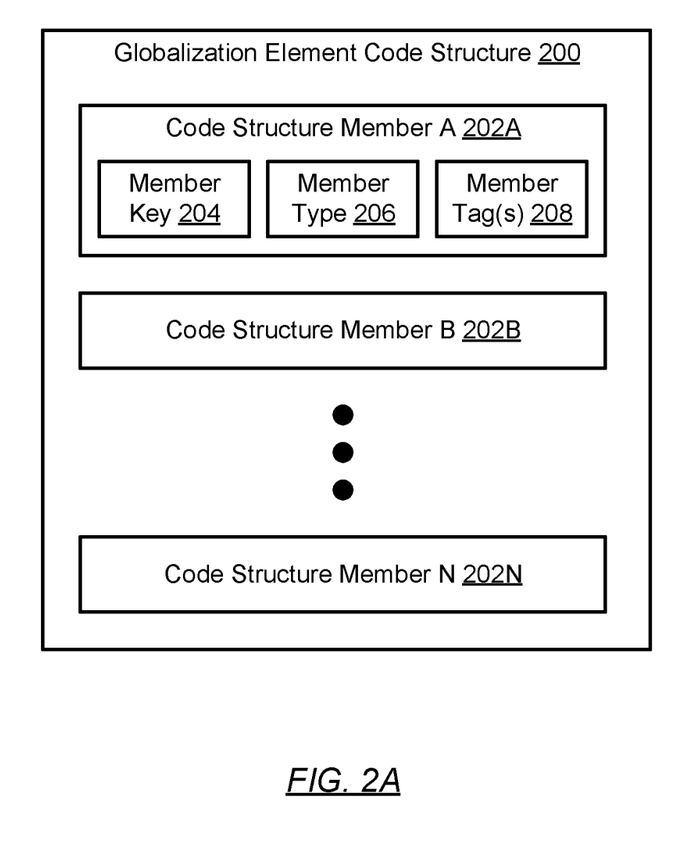
FIG. 2A shows a globalization element code structure in accordance with one or more embodiments described herein.

FIG. 2A shows a globalization element code structure in accordance with one or more embodiments described herein. The globalization element code structure (200) may represent a composite data type, or a collection of objects (of the same or varying data type(s)) grouped together under a single object (or name) in memory. Further, the collection of objects may correspond to globalization element data fields (or attributes), respectively, associated with a globalization element. Any globalization element, in turn, may refer to an aspect (e.g., events, errors, dates and/or times, currencies, addresses, etc.) of a software application that tends to undergo adaptation for international audiences—i.e., a process known as globalization—where said aspect, in whole or in part, may be presented differently (e.g., in terms of language, information formatting, etc.) to said international audiences based on their geographic location (e.g., country, region, etc.) and/or cultural environment.

In one or many embodiment(s) described herein, the globalization element code structure (200) may include one or more code structure member(s) (202A-202N). A/Any code structure member (202A-202N) may refer to a tuple, or a set of at least two related items, respective to and/or defining a given globalization element data field (or attribute) of the globalization element with which the globalization element code structure (200) is associated. Said set of at least two related items may include a member key (204), a member type (206), and (optionally) one or more member tag(s) (208). Each of these items is described below.

Figure 2B:
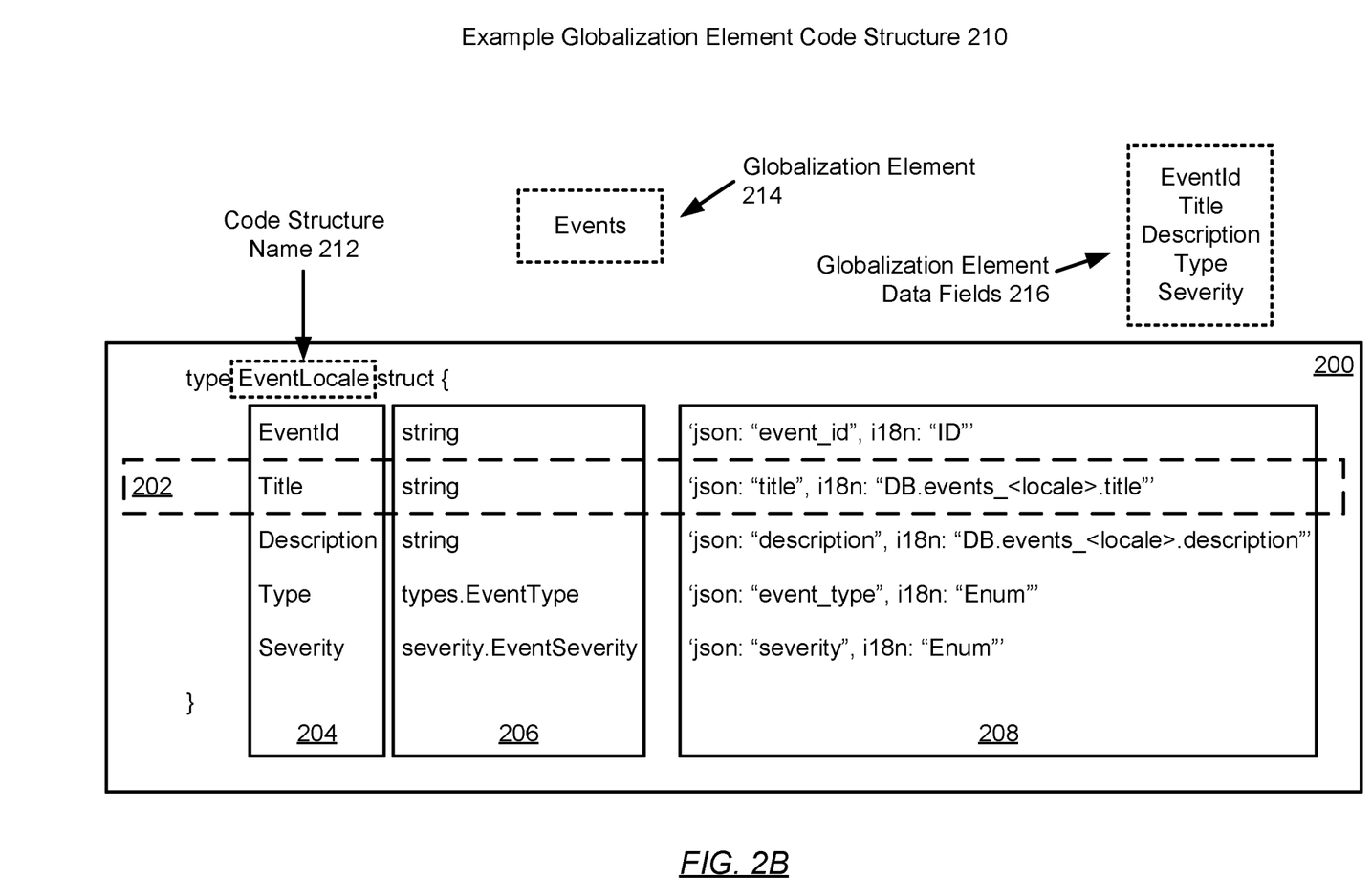
FIG. 2B shows an example globalization element code structure in accordance with one or more embodiments described herein.

In one or many embodiment(s) described herein, the member key (204) may refer to a constant, or an identifier, that references the given globalization element data field (or attribute) of the globalization element. In referencing the given globalization element data field (or attribute), the member key (204) may, though is not limited to, being expressed as any arbitrary length character string similar to, or derived from, the given globalization element data field (or attribute). Examples of the member key (204) are depicted in FIG. 2B, below.

In one or many embodiment(s) described herein, the member type (206) may refer to a data type (e.g., integer, float, string, user-defined type, etc.) belonging to the member key (204) and therefore, by association, the given globalization element data field (or attribute) of the globalization element. Expression of the member type (206) may depend on the data types available through the code programming language used to implement the globalization element code structure (200). Examples of the member type (206), by way of the Golang programming language, are depicted in FIG. 2B, below.

In one or many embodiment(s) described herein, a/any member tag (208) may refer to metadata configured to provide instructions to other source-code (e.g., a remainder of the main program source-code and/or other source-code package(s) external to the main program source-code) that may rely on or work with the globalization element code structure (200). Each member tag (208) may be expressed as a string-based key-value pair, where the key denotes the source-code package to which the provided instructions are directed and the value denotes the instructions sought to be passed to the specified source-code package. Examples of a/any member tag (208), by way of the Golang programming language, are depicted in FIG. 2B, below.

A non-limiting example of the globalization element code structure (200) is illustrated and described with respect to FIG. 2B, below.

FIG. 2B shows an example globalization element code structure in accordance with one or more embodiments described herein. The example globalization element code structure (210) is presented for explanatory purposes only and not intended to limit the scope of the embodiments described herein. Further, the example globalization element code structure is implemented using the Golang programming language, however, one of ordinary skill will appreciate that any globalization element code structure may be implemented using any other programming language(s) capable of declaring and defining code structures.

Turning to FIG. 2B, the example globalization element code structure (210) pertains to a globalization element (214) of "events" related to significant actions or occurrences that may transpire on any computing system (e.g., the computing device (see e.g., FIG. 1)). The globalization element (214), in turn, may be associated with a set of globalization element data fields (216) (e.g., "EventId", "Title", "Description", "Type", and "Severity") each representing an attribute corresponding to the globalization element (214). The example globalization element code structure (210), further, may include or be associated with a user-defined code structure name (212) (e.g., "EventLocale"), which may or may not be similar to (or may or may not be derived from) the globalization element (214).

The example globalization element code structure (210) follows the format or blueprint of the globalization element code structure (200) depicted in FIG. 2A, above. As such, the example globalization element code structure (210) includes a collection of code structure members (202) each presented as a line of code. Each code structure member (202), furthermore, includes: a member key (204) (e.g., "EventId", "Title", "Description", "Type", or "Severity") denoting an identifier referencing a respective globalization element data field (216); a member type (206) (e.g., "string", "string", "string", "types.EventType", or "severity.EventSeverity") denoting a data type of the member key (204); and two member tags (208) (e.g., "'json: "event_id", i18n: "ID"'", "'json: "title", i18n: "DB.events_<locale>.title"'", "'json: "description", i18n: "DB.events_<locale>.description"'", "'json: "event_type", i18n: "Enum"'", or "'json: "severity", i18n: "Enum"'").

Of the two member tags (208) for each code structure member (202), a first member tag, denoted by the "json" key, is directed to a source-code package named "json", whereas a second member tag, denoted by the "i18n" key, is directed to another source-code package named "i18n". The string value following each key provides instructions to the respective source-code package on how to interact with the member key (204) of the code structure member (202) in which the member tag (208) resides or is associated with.

For example, for the code structure member (202) referencing the "Title" globalization element data field (216): the "title" string value attached to the "json" key (i.e., collectively representing the first member tag) instructs the "json" source-code package to use the "title" string value (e.g., a camel-cased version of the respective member key (204)) when encoding or exporting the respective member key (204) (i.e., "Title") to a JavaScript Object Notation (JSON) object; whereas the "DB.events_<locale>.title" string value attached to the "i18n" key (i.e., collectively representing the second member tag) instructs the "i18n" source-code package to retrieve data in the form of title, in a language associated with the "locale" key, from a specified database to dynamically replace the content of the "Title" globalization element data field (216) when executing a software development internationalization process.

Figure 2C:
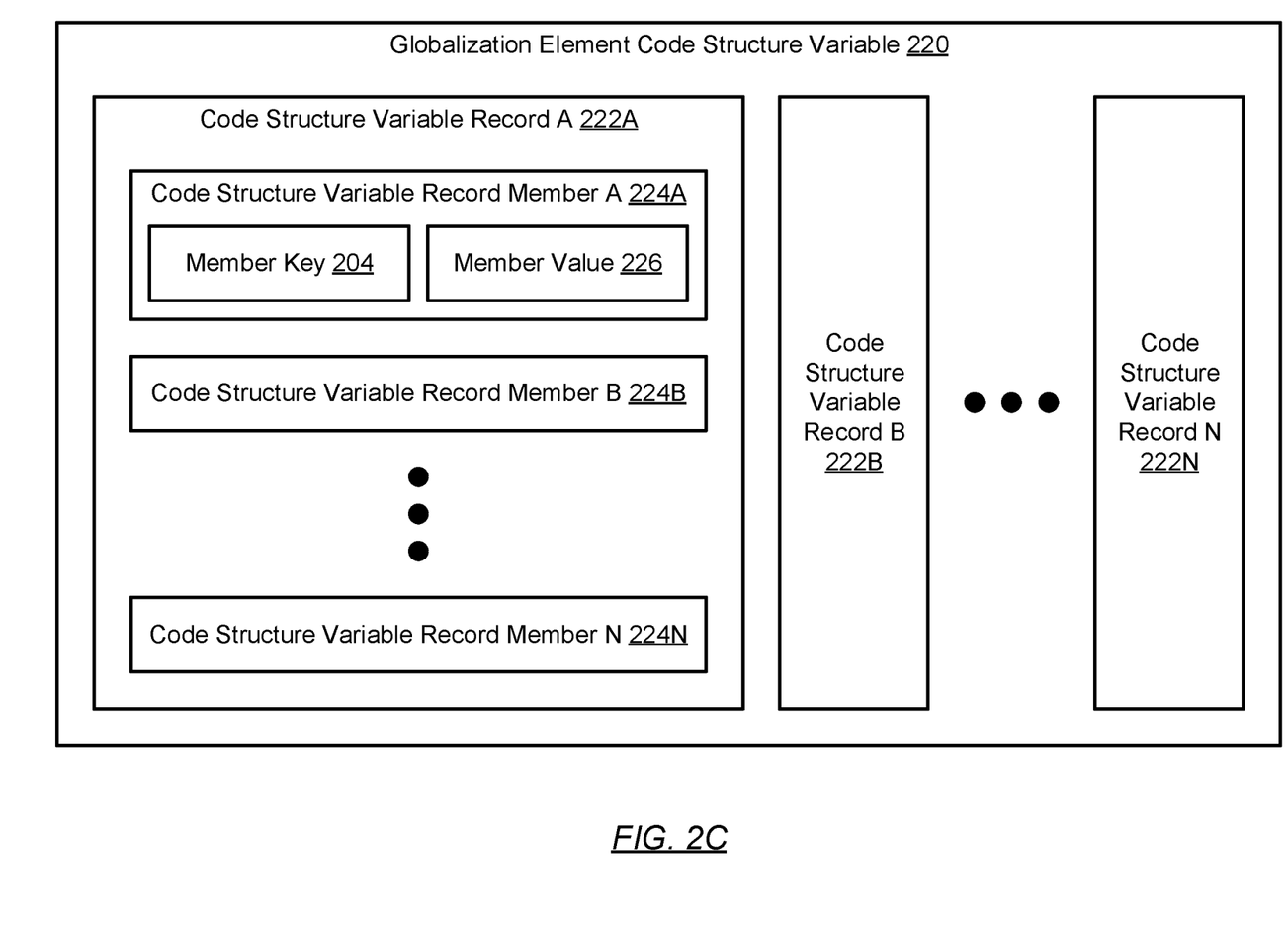
FIG. 2C shows a globalization element code structure variable in accordance with one or more embodiments described herein.

FIG. 2C shows a globalization element code structure variable in accordance with one or more embodiments described herein. The globalization element code structure variable (220) may represent a pairing of a memory location for storing data and a symbolic name (or identifier) associated therewith, where said stored data relates to one or more instance(s) of a globalization element (described above-see e.g., FIG. 2A)—each instance of which conforms to the format defined by a globalization element code structure (see e.g., FIG. 2A) for said globalization element.

In one or many embodiment(s) described herein, the globalization element code structure variable (220) may include one or more code structure variable record(s) (222A-222N). A/Any code structure variable record (222A-222N) may refer to a collection of objects each related to a given instance of the globalization element. Further, a/any code structure variable record (222A-222N) may include one or more code structure variable record member(s) (224A-224N).

In one or many embodiment(s) described herein, a/any code structure variable record member (222A-222N) may refer to a tuple, or a set of two related items, respective to and/or defining a given globalization element data field (or attribute) of the globalization element with which the globalization element code structure variable (220) is associated. Said set of two related items may include a member key (204) and a corresponding member value (226). Each of these items is described below.

In one or many embodiment(s) described herein, the member key (204) may be substantially similar, if not match, the member key (204) described with respect to the globalization element code structure (200) in FIG. 2A, above.

In one or many embodiment(s) described herein, the member value (226) may refer to content, or data, that references the given globalization element data field (or attribute) of the globalization element. In referencing the given globalization element data field (or attribute), the member value (226) may be expressed in the data type associated with the member key (204), which may be defined in a globalization element code structure (200) (see e.g., FIG. 2A) respective to the globalization element. Examples of the member value (226) are depicted in FIG. 2B, below A non-limiting example of the globalization element code structure variable (220) is illustrated and described with respect to FIG. 2D, below.

Figure 2D:
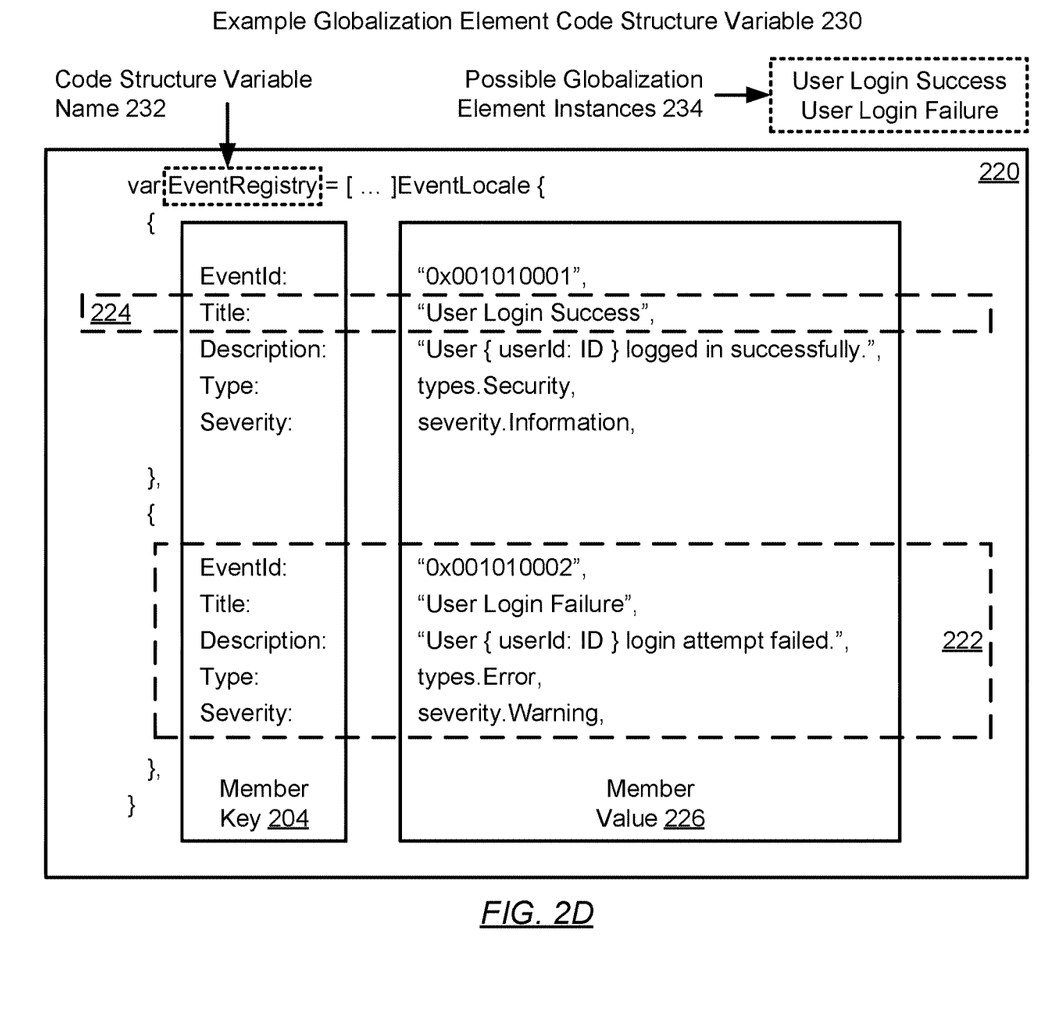
FIG. 2D shows an example globalization element code structure variable in accordance with one or more embodiments described herein.

FIG. 2D shows an example globalization element code structure variable in accordance with one or more embodiments described herein. The example globalization element code structure variable (230) is presented for explanatory purposes only and not intended to limit the scope of the embodiments described herein. Further, the example globalization element code structure variable is implemented using the Golang programming language, however, one of ordinary skill will appreciate that any globalization element code structure variable may be implemented using any other programming language(s) capable of declaring and defining code structure variables.

Turning to FIG. 2D, the example globalization element code structure variable (230), at least in part, is derived from or using the example globalization element code structure (210) depicted in FIG. 2B. As such, the example globalization element code structure variable (230), like the example globalization element code structure (210), pertains to a globalization element (214) of "events" related to significant actions or occurrences that may transpire on any computing system (e.g., the computing device (see e.g., FIG. 1)). The globalization element (214), in turn, may be associated with a set of globalization element data fields (216) (e.g., "EventId", "Title", "Description", "Type", and "Severity") each representing an attribute corresponding to the globalization element (214). The example globalization element code structure variable (230), further, may include or be associated with a user-defined code structure variable name (232) (e.g., "EventRegistry"), which may or may not be similar to (or may or may not be derived from) the globalization element (214). Moreover, the example globalization element code structure variable (230) conveys information relevant to two possible globalization element instances (234) (e.g., "User Login Success" and "User Login Failure") of the "events" globalization element (214).

The example globalization element code structure variable (230) follows the format or blueprint of the example globalization element code structure (210), depicted in FIG. 2B, for each possible globalization element instance (234). As such, the example globalization element code structure variable (230) includes a code structure variable record (222) for each of the two possible globalization element instances (234). From there, each code structure variable record (222) includes a collection of code structure variable record members (224) each presented as a line of code. Each code structure variable record member (224), furthermore, includes: a member key (204) (e.g., "EventId", "Title", "Description", "Type", or "Severity") denoting an identifier referencing a respective globalization element data field (216); and a member value (226) (e.g., "0x001010001"/ "0x001010002", "User Login Success"/"User Login Failure", "User {userId: ID} logged in successfully."/"User {userId: ID} login attempt failed.", "types.Security"/ "types.Error", or "severity. Information"/"severity. Warning") denoting content or data respective to the member key (204) and to the appropriate possible globalization element instance (234).

Figure 3:
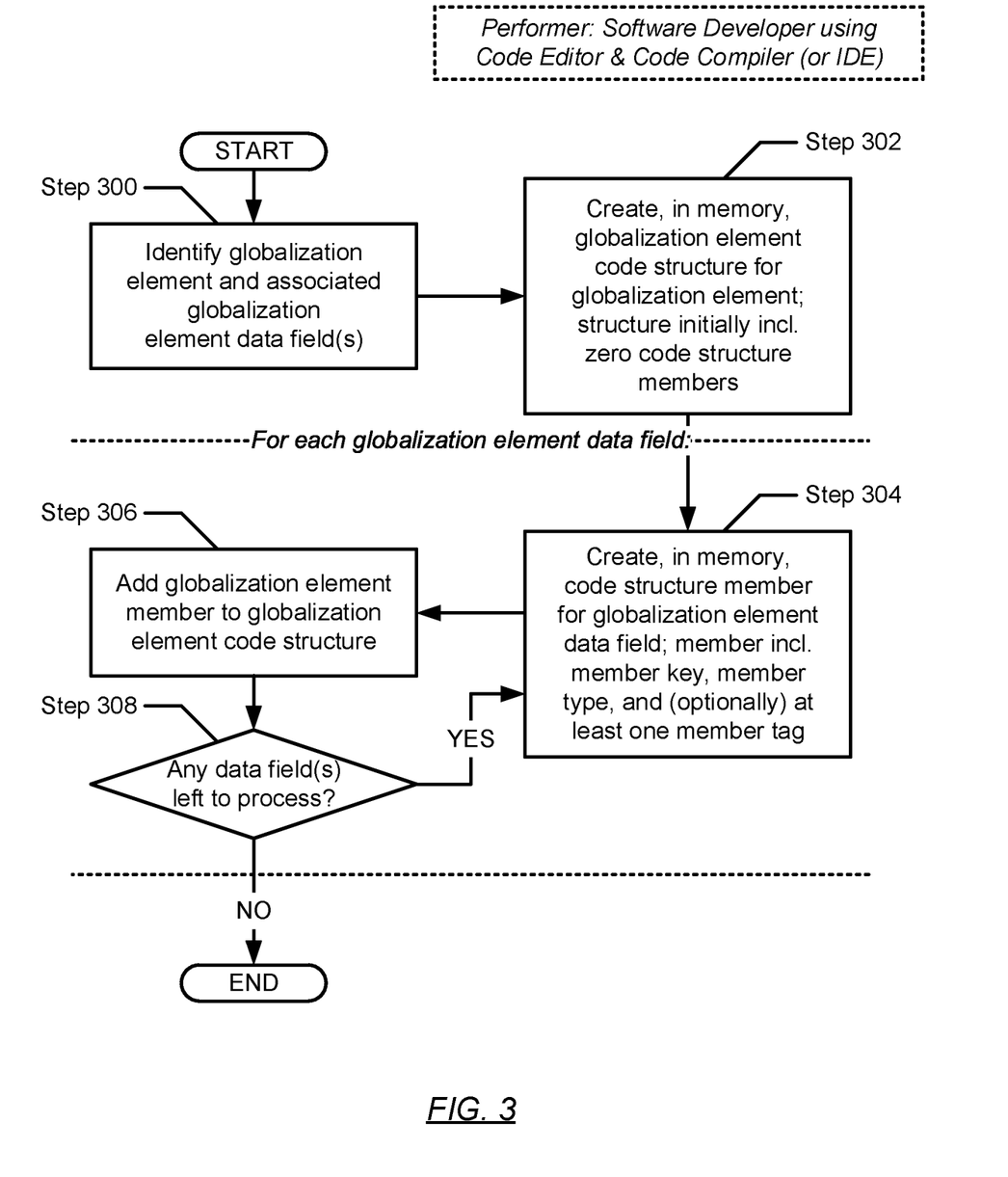
FIG. 3 shows a flowchart describing a method for configuring a globalization element code structure in accordance with one or more embodiments described herein.

FIG. 3 shows a flowchart describing a method for configuring a globalization element code structure in accordance with one or more embodiments described herein. The various steps outlined below may be performed by any software developer operating a computing device (see e.g., FIG. 1A) and using a code editor and a code compiler executing thereon. Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a globalization element, as well as one or more globalization element data field(s) associated therewith, are identified. In one or many embodiment(s) described herein, the globalization element may refer to an aspect (e.g., events, errors, dates and/or times, currencies, addresses, etc.) of a software application that tends to undergo adaptation for international audiences—i.e., a process known as globalization—where said aspect, in whole or in part, may be presented differently (e.g., in terms of language, information formatting, etc.) to said international audiences based on their geographic location (e.g., country, region, etc.) and/or cultural environment. A/Any globalization element data field, meanwhile, may refer to an attribute of the globalization element. Examples of a globalization element, and any associated globalization element data field(s), may be depicted in FIG. 2B.

In Step 302, a globalization element code structure, for the globalization element (identified in Step 300), is created. In one or many embodiment(s) described herein, the globalization element code structure may represent a composite data type, or a collection of objects (of the same or varying data type(s)) grouped together under a single object (or name). Creation of the globalization element code structure may entail generating a shell thereof, which may initially include or be associated with: a user-defined code structure name (see e.g., FIG. 2B) assigned to the globalization element code structure; and zero code structure members (see e.g., FIG. 2A). Further, the globalization element code structure may be stored within, and thereafter may be accessible through, one or more memory location(s) in memory.

The remaining steps (i.e., Steps 304, 306, and 308) presented and described hereinafter are pertinent to, and thus performed for, each globalization element data field of the globalization element data field(s) (identified in Step 300).

In Step 304, a code structure member, for the globalization element data field, is created. In one or many embodiment(s) described herein, the code structure member may refer to a tuple, or a set of at least two related items, respective to and/or defining the globalization element data field. The set of at least two related items may include a member key, a member type, and (optionally) at least one member tag (all described above—see e.g., FIG. 2A; for examples—see e.g., FIG. 2B). Further, the code structure member may be stored within, and thereafter may be accessible through, one or more memory location(s) in memory.

In Step 306, the globalization element member (created in Step 304) is added to, or incorporated into, the globalization element code structure (created in Step 302). In one or many embodiment(s) described herein, memory-wise, the addition/incorporation of the globalization element member to/into the globalization element code structure may, for example, involve linking the memory location(s) associated with the former to the memory location(s) associated with the latter.

In Step 308, a determination is made as to whether any other globalization element data field(s) (identified in Step 300) remain to be processed. In one or many embodiment(s) described herein, if it is determined that at least one other globalization element data field remains to be processed, then the method proceeds to Step 304, where another code structure member is created for one of the at least one other globalization element data field awaiting processing. On the other hand, in one or many other embodiment(s) described herein, if it is alternatively determined that all globalization element data field(s) have been processed, then the method alternatively ends, where the (configured) globalization element code structure (i.e., the globalization element code structure populated via Steps 304, 306, and 308 for each globalization element data field) is obtained.

Figure 4A:
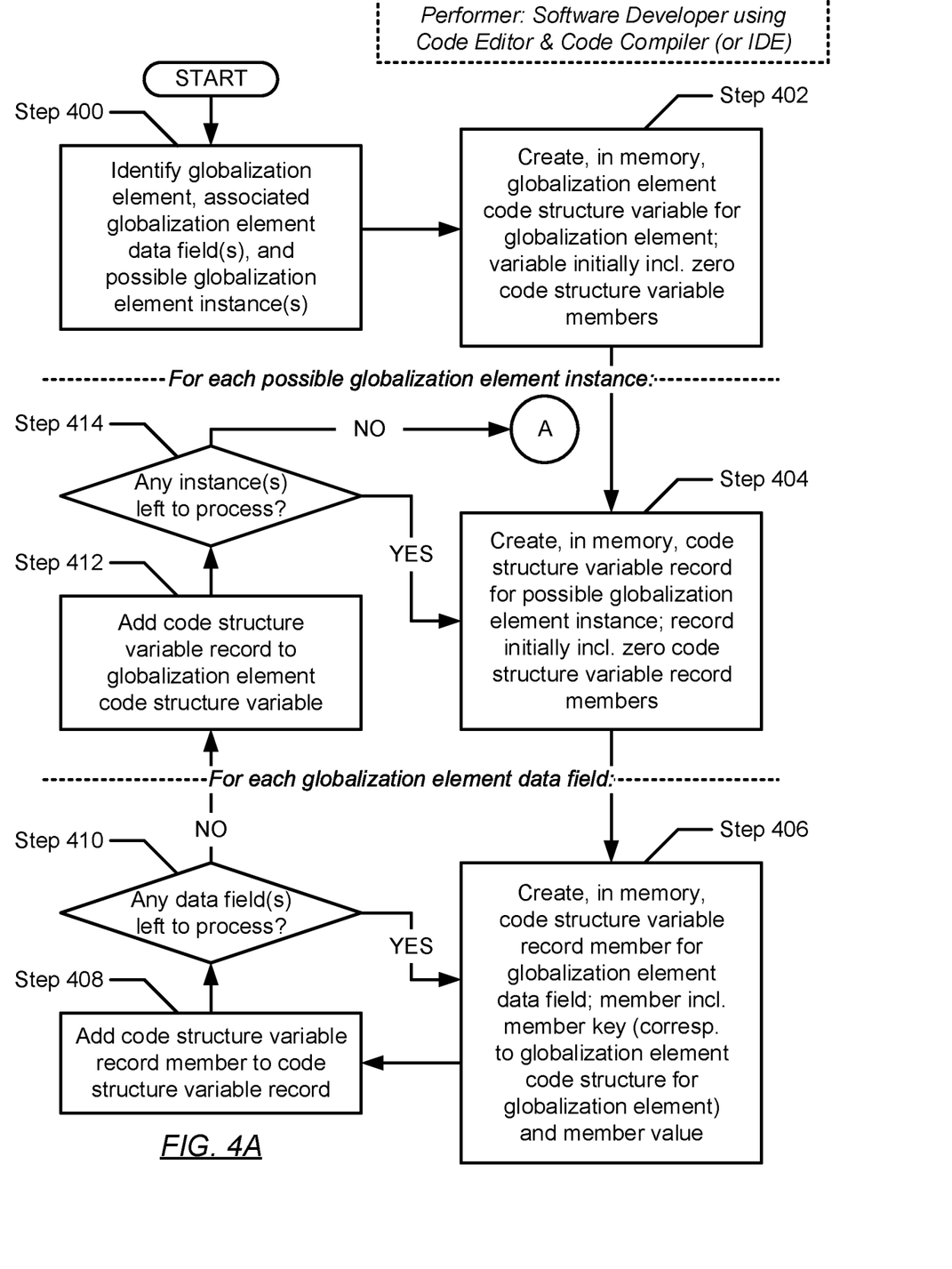
FIGS. 4A and 4B show a flowchart describing a method for configuring a globalization element code structure variable in accordance with one or more embodiments described herein.
Figure 4B:
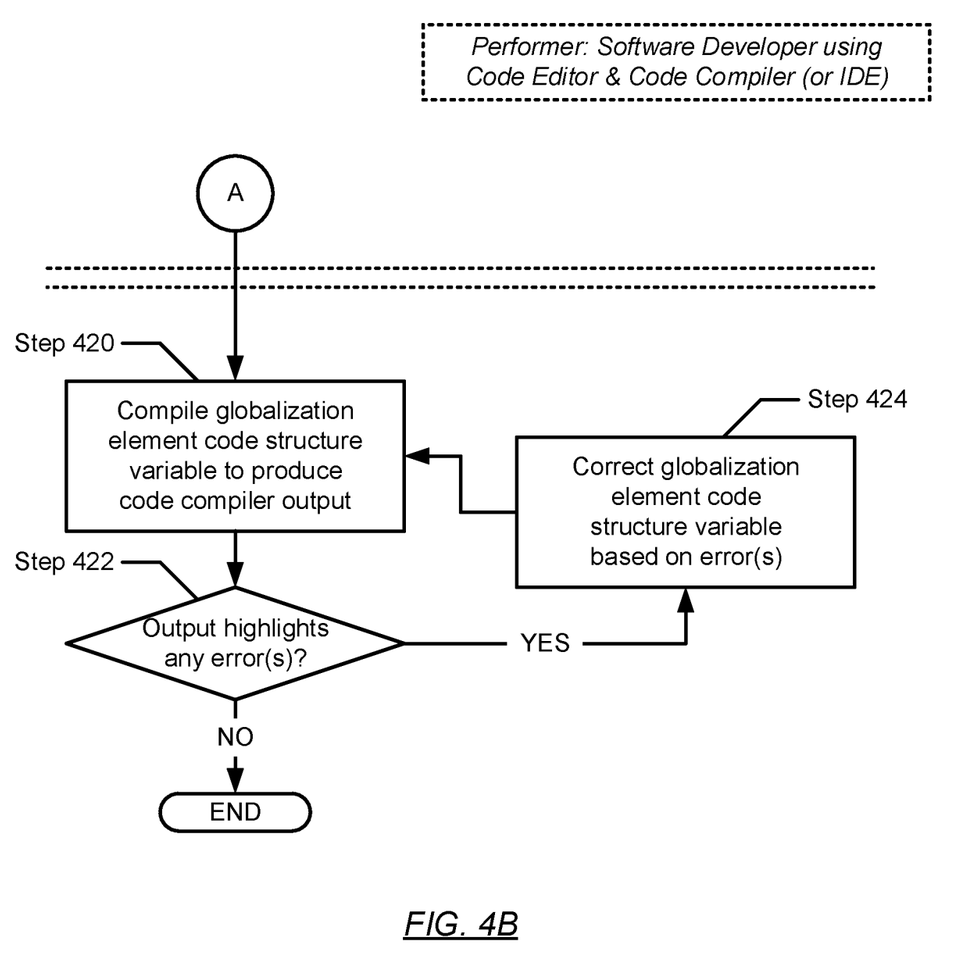

FIGS. 4A and 4B show a flowchart describing a method for configuring a globalization element code structure variable in accordance with one or more embodiments described herein. The various steps outlined below may be performed by any software developer operating a computing device (see e.g., FIG. 1A) and using a code editor and a code compiler executing thereon. Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, a globalization element, one or more globalization element data field(s) associated therewith, and a set of possible globalization element instance(s) are identified. In one or many embodiment(s) described herein, the globalization element may refer to an aspect (e.g., events, errors, dates and/or times, currencies, addresses, etc.) of a software application that tends to undergo adaptation for international audiences—i.e., a process known as globalization—where said aspect, in whole or in part, may be presented differently (e.g., in terms of language, information formatting, etc.) to said international audiences based on their geographic location (e.g., country, region, etc.) and/or cultural environment. A/Any globalization element data field, meanwhile, may refer to an attribute of the globalization element. Examples of a globalization element, and any associated globalization element data field(s), may be depicted in FIG. 2B. Moreover, a/any possible globalization element instance may refer to an example of the globalization element.

In Step 402, a globalization element code structure variable, for the globalization element (identified in Step 400), is created. In one or many embodiment(s) described herein, the globalization element code structure variable may represent a pairing of a memory location for storing data and a symbolic name (or identifier) associated therewith, where said stored data relates to the possible globalization element instance(s) (identified in Step 400). Creation of the globalization element code structure variable may entail generating a shell thereof, which may initially include or be associated with: a user-defined code structure variable name (see e.g., FIG. 2D) assigned to the globalization element code structure variable; and zero code structure variable record members (see e.g., FIG. 2C). Further, the globalization element code structure variable may be stored within, and thereafter may be accessible through, one or more memory location(s) in memory.

A subset of the remaining steps (i.e., Steps 404, 406, 408, 410, 412, and 414) presented and described hereinafter are pertinent to, and thus performed for, each possible globalization element instance of the possible globalization element instance(s) (identified in Step 400).

In Step 404, a code structure variable record, for the possible globalization element instance, is created. In one or many embodiment(s) described herein, the code structure variable record may refer to a collection of objects each related to the possible globalization element instance. Creation of the code structure variable record may entail generating a shell thereof, which may initially include or be associated with: zero code structure variable record members (see e.g., FIG. 2C). Further, the code structure variable record may be stored within, and thereafter may be accessible through, one or more memory location(s) in memory.

A subset of the remaining steps (i.e., Steps 406, 408, and 410) presented and described hereinafter are pertinent to, and thus performed for, each globalization element data field of the globalization element data field(s) (identified in Step 400).

In Step 406, a code structure variable record member, for the globalization element data field, is created. In one or many embodiment(s) described herein, the code structure variable record member may refer to a tuple, or a set of two related items, respective to and/or defining the globalization element data field. The set of two related items may include a member key (corresponding to a globalization element code structure (see e.g., FIG. 2A) for the globalization element (identified in Step 400)) and a member value (all described above-see e.g., FIG. 2C; for examples—see e.g., FIG. 2D). Further, the code structure variable record member may be stored within, and thereafter may be accessible through, one or more memory location(s) in memory.

In Step 408, the code structure variable record member (created in Step 406) is added to, or incorporated into, the code structure variable record (created in Step 404). In one or many embodiment(s) described herein, memory-wise, the addition/incorporation of the code structure variable record member to/into the code structure variable record may, for example, involve linking the memory location(s) associated with the former to the memory location(s) associated with the latter.

In Step 410, a determination is made as to whether any other globalization element data field(s) (identified in Step 400) remain to be processed. In one or many embodiment(s) described herein, if it is determined that at least one other globalization element data field remains to be processed, then the method proceeds to Step 406, where another code structure variable record member is created for one of the at least one other globalization element data field awaiting processing. On the other hand, in one or many other embodiment(s) described herein, if it is alternatively determined that all globalization element data field(s) have been processed, then the method proceeds to Step 412.

In Step 412, following the determination (made in Step 410) that all globalization element data field(s) (identified in Step 400) have been processed, the (configured) code structure variable record (i.e., the code structure variable record populated via Steps 406, 408, and 410 for each globalization element data field) is added to, or incorporated into, the globalization element code structure variable (created in Step 402). In one or many embodiment(s) described herein, memory-wise, the addition/incorporation of the code structure variable record to/into the code structure variable may, for example, involve linking the memory location(s) associated with the former to the memory location(s) associated with the latter.

In Step 414, a determination is made as to whether any other possible globalization element instance(s) (identified in Step 400) remain to be processed. In one or many embodiment(s) described herein, if it is determined that at least one other possible globalization element instance remains to be processed, then the method proceeds to Step 404, where another code structure variable record is created for one of the at least one other possible globalization element instance awaiting processing. On the other hand, in one or many other embodiment(s) described herein, if it is alternatively determined that all possible globalization element instance(s) have been processed, then the method proceeds to Step 420 (see e.g., FIG. 4B).

Turning to FIG. 4B, in Step 420, following the determination (made in Step 414) that all possible globalization element instance(s) (identified in Step 400) have been processed, the (configured) globalization element code structure variable (i.e., the globalization element code structure variable populated via Steps 404, 406, 408, 410, 412, and 414 for each possible globalization element instance and via Steps 406, 408, and 410 for each globalization element data field) is obtained. Thereafter, the (configured) globalization element code structure variable is compiled, using the code compiler (see e.g., FIG. 1), to produce a code compiler output. In one or many embodiment(s) described herein, the code compiler output may display information concerning compilation of the (configured) globalization element code structure variable. Said displayed information may include, but is not limited to, information messages, warnings (if any), and errors (if any). Further, said displayed information may aid the software developer to identify and troubleshoot any problem area(s) of the (configured) globalization element code structure variable.

In Step 422, a determination is made as to whether displayed information of the code compiler output (produced in Step 420) highlights any error(s). In one or many embodiment(s) described herein, if it is determined that at least one error has been cited in the code compiler output, then the method proceeds to Step 424. On the other hand, in one or many other embodiment(s) described herein, if it is alternatively determined that no/zero error(s) have been cited in the code compiler output, then the method ends, where an error-free (configured) globalization element code structure variable is obtained.

In Step 424, following the determination (made in Step 422) that the displayed information of the code compiler output (produced in Step 420) cites at least one error, the (configured) globalization element code structure variable is corrected based on said cited at least one error. Thereafter, the method proceeds to Step 420, where the (corrected, configured) globalization element code structure variable is compiled to produce another code compiler output.

Figure 5:
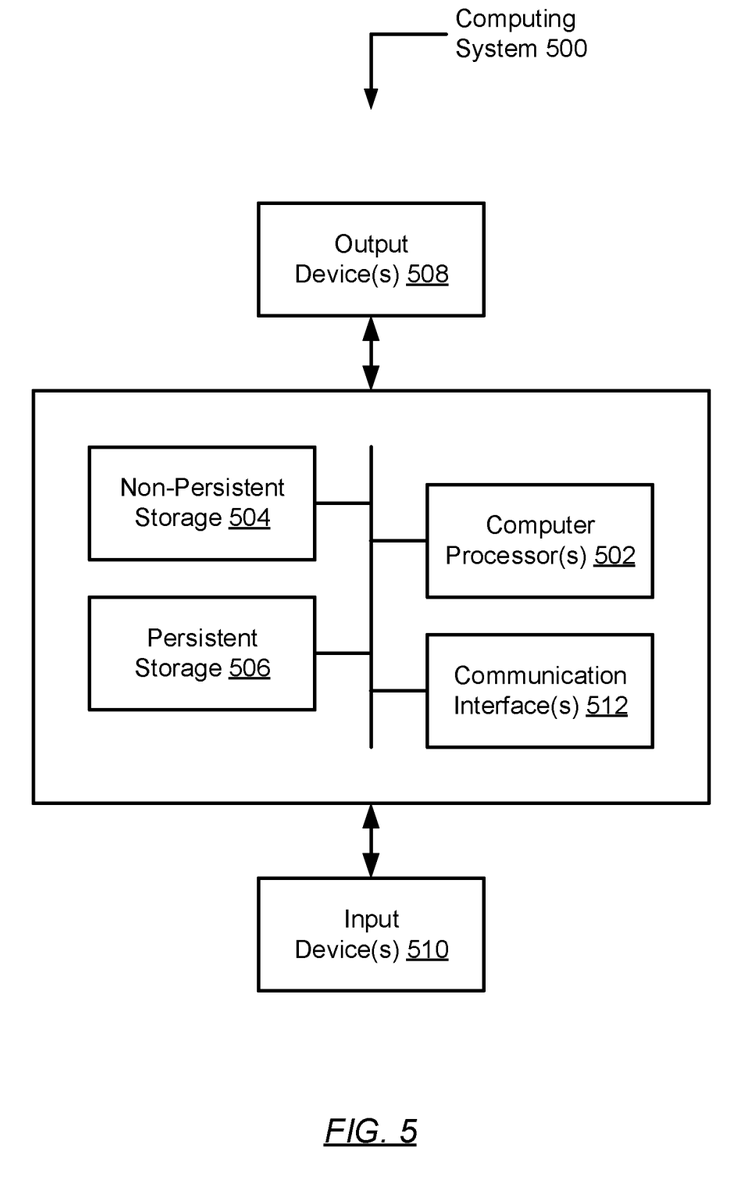
FIG. 5 shows a computing system in accordance with one or more embodiments described herein.

FIG. 5 shows a computing system in accordance with one or more embodiments described herein. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or many embodiment(s) described herein, the computer processor(s) (302) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one or many embodiment(s) described herein, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for optimizing software development globalization, the method comprising:
   identifying a globalization element and at least one globalization element data field associated therewith;
   configuring, into a source-code and for the globalization element, a globalization element code structure comprising at least one member key, respectively and at least in part, defining the at least one globalization element data field;
   configuring, for the globalization element, a globalization element code structure variable based on the globalization element code structure;
   compiling the globalization element code structure variable to produce a code compiler output;
   making a first determination that the code compiler output cites at least one error;
   correcting, based on the first determination and the at least one error, the globalization element code structure variable to obtain a corrected globalization element code structure variable; and
   compiling, after the correcting, the corrected globalization element code structure variable to produce a second code compiler output.

2. The method of claim 1, wherein the globalization element code structure further comprises a member type for each member key of the at least one member key.

3. The method of claim 2, the method further comprising:
   compiling the source-code, using a code compiler, to support compile time validation of the at least one member key and the at least one member type.

4. The method of claim 2, wherein the globalization element code structure further comprises a member tag for each member key of the at least one member key.

5. The method of claim 4, wherein the member tag comprises metadata configured to provide instructions to other source-code working at least with the member key in the globalization element code structure associated with the member tag.

6. The method of claim 5, wherein when directly referencing the member key in the globalization element code structure, the other source-code executes the instructions in the member tag associated therewith to retrieve data corresponding to a globalization element data field at least in part defined by the member key.

7. The method of claim 6, wherein the instructions specify a locale and the data comprises text in a language associated with the locale.

8. A non-transitory computer readable medium comprising computer readable program code, which when executed by a computer processor, enables the computer processor to perform a method for optimizing software development globalization, the method comprising:

configuring, for a globalization element, a globalization element code structure, the configuring comprising:
  identifying the globalization element and at least one globalization element data field associated therewith;
  for each globalization element data field of the at least one globalization element data field:
    creating, for the globalization element data field, a code structure member comprising a member key and a member type;
    populating the globalization element code structure using the code structure member;
configuring, for the globalization element, a globalization element code structure variable based on the globalization element code structure;
compiling the globalization element code structure variable to produce a code compiler output;
making a first determination that the code compiler output cites at least one error;
correcting, based on the first determination and the at least one error, the globalization element code structure variable to obtain a corrected globalization element code structure variable; and
compiling, after the correcting, the corrected globalization element code structure variable to produce a second code compiler output.

9. The non-transitory computer readable medium of claim 8, wherein the globalization element comprises a software application aspect sought to be adapted for international users.

10. The non-transitory computer readable medium of claim 9, wherein each of the at least one globalization element data field comprises an attribute respective to the software application aspect.

11. The non-transitory computer readable medium of claim 8, wherein the code structure member further comprises at least one member tag.

12. The non-transitory computer readable medium of claim 11, wherein the at least one member tag comprises metadata configured to provide instructions to source-code working with the globalization element code structure.

13. The non-transitory computer readable medium of claim 8, the method further comprising:
configuring, for the globalization element, a globalization element code structure variable based on the globalization element code structure.

14. The non-transitory computer readable medium of claim 13, wherein configuring the globalization element code structure variable comprises:
identifying a set of possible globalization element instances of the globalization element;
for each possible globalization element instance in the set of possible globalization element instances:
  creating, for each globalization element data field of the at least one globalization element data field and to obtain at least one code structure variable record member, a code structure variable record member comprising the member key and a member value;
  populating, for the possible globalization element instance and to obtain a set of globalization element code structure variable records, a globalization element code structure variable record using the at least one code structure variable record; and
populating the globalization element code structure variable using the set of globalization element code structure variable records.

15. A computing device, the computing device comprising:
memory;
a computer processor operatively connected to the memory; and
a code editor and a code compiler both executing on the computer processor and configured, when interacted with, to perform a method for optimizing software development globalization, the method comprising:
configuring, for a globalization element, a globalization element code structure, the configuring comprising:
  identifying the globalization element and at least one globalization element data field associated therewith;
  for each globalization element data field of the at least one globalization element data field:
    creating, for the globalization element data field, a code structure member comprising a member key and a member type; and
    populating the globalization element code structure using the code structure member;
configuring, for the globalization element, a globalization element code structure variable based on the globalization element code structure;
compiling the globalization element code structure variable to produce a code compiler output;
making a first determination that the code compiler output cites at least one error;
correcting, based on the first determination and the at least one error, the globalization element code structure variable to obtain a corrected globalization element code structure variable; and
compiling, after the correcting, the corrected globalization element code structure variable to produce a second code compiler output.

16. The computing device of claim 15, wherein the globalization element comprises a software application aspect sought to be adapted for international users.

17. The computing device of claim 16, wherein each of the at least one globalization element data field comprises an attribute respective to the software application aspect.

18. The computing device of claim 15, wherein the code structure member further comprises at least one member tag.

19. The computing device of claim 18, wherein the at least one member tag comprises metadata configured to provide instructions to source-code working with the globalization element code structure.

20. The computing device of claim 15, the method further comprising:
configuring, for the globalization element, a globalization element code structure variable based on the globalization element code structure.

* * * * *